United States Patent
Kurylo

(10) Patent No.: US 12,234,917 B2
(45) Date of Patent: Feb. 25, 2025

(54) VALVE FOR MINIMUM WASTE CONCRETING PUMP

(71) Applicant: Alberto Kurylo, Porto Alegre (BR)

(72) Inventor: Alberto Kurylo, Porto Alegre (BR)

( * ) Notice: Subject to any disclaimer, the term of this patent is extended or adjusted under 35 U.S.C. 154(b) by 304 days.

(21) Appl. No.: 17/920,959

(22) PCT Filed: Dec. 21, 2020

(86) PCT No.: PCT/BR2020/050573
§ 371 (c)(1),
(2) Date: Oct. 24, 2022

(87) PCT Pub. No.: WO2022/133554
PCT Pub. Date: Jun. 30, 2022

(65) Prior Publication Data
US 2023/0204111 A1  Jun. 29, 2023

(51) Int. Cl.
*F16K 11/065*  (2006.01)
*F04B 15/02*  (2006.01)
(Continued)

(52) U.S. Cl.
CPC ............ *F16K 11/065* (2013.01); *F04B 15/02* (2013.01); *F04B 53/10* (2013.01); *F16K 27/04* (2013.01)

(58) Field of Classification Search
None
See application file for complete search history.

(56) References Cited

U.S. PATENT DOCUMENTS

| 2,252,141 A | * | 8/1941 | Seidel ................ F16K 11/0655 |
| | | | 137/625.48 |
| 3,678,959 A | * | 7/1972 | Liposky .............. A61M 39/223 |
| | | | 251/282 |

(Continued)

FOREIGN PATENT DOCUMENTS

| BR | 112012019747 A2 | 5/2016 |
| CN | 202510757 U | * 10/2012 |

(Continued)

OTHER PUBLICATIONS

International Search Report in PCT/BR2020/050573, mailed Sep. 14, 2021 and English Language Translation.
Written Opinion in PCT/BR2020/050573, mailed Sep. 14, 2021.

*Primary Examiner* — Angelisa L. Hicks
(74) *Attorney, Agent, or Firm* — Pilloff Passino & Cosenza LLP; Rachel Pilloff; Sean Passino

(57) ABSTRACT

The valve for the minimum waste concrete pump, object of the present invention, comprises a valve for the minimum waste concrete pump that comprises a double-piston alternative-type pump valve provided with an inlet conduit (20) and a discharge conduit (30) installed inside the valve container (10) and arranged next to a concrete reception hopper located above the container, allowing to pump concrete and other pasty substances, such as: sludge, mining residues, grout, mortar, dirty water, and similar. The embodiment of the valve generates the minimum of waste retained after the equipment operation, improving the durability and efficiency of use of the pumps, besides reducing the cleaning time, resulting in a great reduction of operational costs, avoiding the unnecessary displacement of the pump equipment to the central. In addition, this new embodiment results in a valve performing a linear translation movement that reduces component wear and minimizes the need for main- (Continued)

tenance on the equipment, as its embodiment does not require constant lubrication.

15 Claims, 23 Drawing Sheets

(51) Int. Cl.
*F04B 53/10* (2006.01)
*F16K 27/04* (2006.01)

(56) References Cited

U.S. PATENT DOCUMENTS

| | | |
|---|---|---|
| 3,682,575 A | 8/1972 | Guddal |
| 3,889,713 A | 6/1975 | Bender |
| 4,046,166 A | 9/1977 | Bender |
| 4,142,846 A | 3/1979 | Yoshikawa |
| 5,330,327 A | 7/1994 | Anderson |
| 5,857,490 A | 1/1999 | Kao |
| 2005/0011350 A1 | 1/2005 | Remus |
| 2012/0318390 A1 | 12/2012 | Yi |
| 2013/0263947 A1* | 10/2013 | Liang .............. F16K 11/0873 137/565.11 |

FOREIGN PATENT DOCUMENTS

| | | | |
|---|---|---|---|
| CN | 207808420 U * | 9/2018 | |
| CN | 112343812 A * | 2/2021 | ............. F04B 15/02 |
| EP | 2700852 A1 | 2/2014 | |
| WO | WO-2021018994 A1 * | 2/2021 | ............. F04B 15/02 |

* cited by examiner

VALVE FOR MINIMUM WASTE CONCRETING PUMP

CROSS REFERENCE

This application is a national stage of international application no. PCT/BR2020/050573, filed 21 Dec. 2022, and is incorporated herein by reference in its entirety.

FIELD OF THE INVENTION

The present invention describes a valve for a minimum waste concrete pump. More specifically, it comprises a double-piston alternative-type pump valve for pump provided with an inlet conduit and an outlet conduit installed inside the valve container and arranged next to a concrete reception hopper located above the container, allowing to pump concrete and other pasty substances, such as: sludge, mining residues, grout, mortar, dirty water, and similar.

The embodiment of the valve generates a minimum of waste retained after the equipment operation, generating a more homogeneous wear of the wearing parts, dispensing constant interventions to compensate for irregular wear and the efficiency of use of the pumps, in addition to reducing the cleaning time, which results in a great reduction of operating costs, avoiding the unnecessary displacement of the equipment to the company headquarters or some other suitable place destined to the disposal and giving adequate destination to the waste generated during the equipment cleaning after the conclusion of each event of pumping.

In addition, this embodiment results in a valve that does not need constant lubrication and performs a linear translation movement, generating a more homogeneous wear of the components and minimizing the need for maintenance on the equipment due to the need for constant interventions to compensate for irregular wear.

BACKGROUND OF THE INVENTION

Currently, the valves of concrete pumps most used in the market, produced by the main manufacturers worldwide, are characterized in that it has a single conduit (a discharge conduit), which is positioned inside the concrete reception hopper, that is, this conduit it is the valve working submerged in the concrete within the hopper.

At the end of the operation, due to the pump cylinders not being able to suck a significant amount of concrete from inside the hopper, a post-operation waste accumulates which must be removed in the equipment cleaning process.

The equipment cleaning process usually takes place in two steps:
 waste disposal: normally done by opening a gate at the bottom of the hopper, which results in the flow by gravity of most of the concrete retained inside the hopper;
 hopper washing: after hopper draining, a pressurized water jet is washed to remove the rest of the waste, as well as portions adhered to the inner walls of the hopper.

On certain occasions, when working with very fast curing cement concrete, at higher ambient temperatures and with insufficient water jet pressure, mechanical assistance through scraping with a spatula or some other tool may be needed.

Another aggravating factor that makes it even more inconvenient to have a greater amount of post-operation waste is the fact that most of the places where the equipment is installed to operate, it is not convenient to dispose of this waste, as they are on public roads, inside condominiums, company yards, among other places, and it is necessary to collect the equipment with this waste accumulation inside the hopper to any place that is suitable for disposal and gives the correct destination to the waste, and on some occasions it is possible to dispose of it at the construction site itself.

This need to move the equipment to a suitable place for waste disposal generates other several drawbacks:
 a longer concrete curing time results in a greater incrustation inside the hopper, as well as inside the valve, resulting in a greater difficulty in cleaning and, subsequently, a longer period of unavailability of the equipment;
 This dislocation for cleaning generates an increase in man/hour+machine/hour to the company's operating costs as well as a reduction in the availability of equipment to attend to other works.

Thus, if the residual concrete is reduced to a minimum, as the device claimed herein proposes, this equipment cleaning could take place in almost all the works, in the very place where the equipment was operated.

The number of works a pumping equipment can handle in a day depends on several factors, many of which are out of the service provider control, such as: time allowed by the work for pouring concrete, speed of pouring concrete that is undertaken by the pouring team, distance from the job site to the concrete plant, traffic speed on the way to the job and volume of concrete to be pumped.

Therefore, if the equipment allowed for a much faster cleaning and with a minimum waste, time would be saved and costs with operational inputs (fuel and other wear on the road) would be reduced, avoiding the displacement to the central in the interval of each work (or those where disposal is not possible).

It is important to point out that normally a pumping equipment performs two small to medium-sized concreting works, this in a daily journey. So, let's assume that it does not return to the plant for cleaning, it will be able to perform another third work, in this case the volume of works performed by the equipment has increased by 50% with less wear, less fuel consumption, less generation of polluting waste and also less distress on the operating team.

In view of all the inconveniences that can be observed in relation to the generation of waste after the operation, together with the prior art equipment, we can highlight the product claimed herein shows an embodiment that generates a minimum waste, which facilitates cleaning in the location, avoiding the need to move the equipment.

On the other hand, it is worth noting that the most common valves on the market use a rotary translation movement for it switch which require a shaft and rotating bearings to pivot this movement, so that these bearings in order to have a good operation and a good useful life need of lubrication. However, as these rotary valves are installed inside the concrete reception hopper, these bearings during operation remain together with the valve, submerged in the concrete, a fact that worsening its requirement in relation to lubrication, since it is in constant contact with the thin and abrasive concrete cement grout.

Due to this contamination, the equipment requires constant lubrication that serves to replace the lubrication that would normally be expelled in any type of bearing in operation, as well as to expel the grease contaminated by the cement grout that infiltrates the bearing. Failure to comply with this requirement in relation to the constant lubrication of the bearings, as the first damage, can cause an obstruction of the lubricant flow in the bearings, this is because the excess of contamination of the grease inside the bearing, causes a hardening (loses the fluidity) of the grease.

Thus, if the equipment is put into maintenance service to clear clogged bearings, unavailability and labor costs have already been generated, so that if the problem is not remedied in a timely manner, the equipment operation with deficient lubrication will generate excessive wear on the shafts and bushings of the bearings, which will later imply replacement of parts, resulting in equipment stoppage and, subsequently, generating labor costs and costs of the parts to be replaced.

As can be seen, lubrication with grease injection in the valve bearings of these equipment is a permanent care, which also generates costs with the acquisition and control of the use of grease, as well as the grease propulsion equipment. It is also worth noting the environmental impact of this equipment, as the need for lubrication is so intense, it can imagine that much of this grease ends up contaminating the environment (soil, water from rivers and streams, sewage without proper treatment).

Another negative impact is related to the unsanitary nature of the operator, as he/she ends up having constant contact with the grease, and if he/she is not the operator, it must be someone else in charge. There are automatic lubrication systems that lessen the constant intervention of the operator, but in addition to being expensive, they require a certain care (filling up the reservoir and regarding malfunctions), and because it is a system that must be automatic, it tends to generate an operator omission. Due to the complexity of this system, they have a significant cost of implementation and are not immune to failure in a way that ends up being seen as disadvantageous by many equipment owners.

In view of all the drawbacks that can be observed in relation to the need for lubrication, together with the prior art equipment, we can highlight that the product claimed herein shows an embodiment that inhibits the need for constant lubrication of the components due to the commutation being performed by hydraulic fluid. It should be noted that the valves of prior art equipment, for the most part, use hydraulic fluid (in case of hydraulic oil) to switch the valves, but in addition to having rotation bearings with or without contact with the pumped fluid, they have several mechanical joints between hydraulic cylinders and valve components, and these joints require lubrication. In the claimed device, the cylinders are connected to the valve components to transmit the switch movement in an almost static way, in the claimed case, pins and bushings with telescopic movement that will move a few millimeters with the progression of the abrasion of the wearing plates.

Another important factor to analyze is in relation to the switching of current prior art equipment, which mostly work through a rotary switch. In addition, this equipment has sacrifice plates (or wear plates) which are the parts that are sacrificed during the friction of the valve switch movement.

These plates are usually manufactured and/or coated with a material of high hardness and abrasion resistance. After a certain wear limit, these plates must be replaced, not only in order to maintain the equipment working capacity, but also to maintain satisfactory performance.

Thus, the rotary commutation of current prior art models generates greater wear on the components, because due to the embodiment of these valves, the plates, in this case a section of the same part of the wear plate located further away from the axis of rotation, describe a greater course during the movement, due to the larger turning radius, will have a more accentuated wear. This irregular wear of the plates creates gaps that in turn result in leaks, which compromise the good performance of the equipment, which depending on their level, can make the equipment unfeasible. As a way to alleviate this inconvenience and generate a better use of the wear plates, some manufacturers recommend a periodic adjustment consisting of 180° rotation of the wear plates that are possible to rotate.

In addition, in order to reduce the leaks generated by the wear of sacrificial plates (wear plates), the most common equipment has some wear compensation devices that are compensated by rubber rings, which expand and push a wear plate against each other, mitigating leaks. Other equipment has screws and/or nuts in addition to rubber rings to perform an adjustment of greater amplitude.

In view of all the drawbacks that can be observed in relation to rotary switching and the wear of the sacrificial plates, together with the prior art equipment, we can highlight that the product claimed herein has a valve with linear switching that generates much more homogeneous wear, minimizing leaks and maintaining a satisfactory performance throughout the life of the wear plates, and without the need for interventions to compensate for irregular wear.

In search performed in the state of the art, we identified several documents describing valves for concrete pumps, wherein it can be highlighted the following documents:

U.S. Pat. No. 3,889,713 (Wibau. 1972) describes a valve adapted for use in conduits through which construction mixes, such as concrete mixes, flow. The valve apparatus is constructed for cooperation with a pump having two pistons in two respective pump cylinders. For this purpose, a cylindrical valve housing is provided with first ports connected to said pump, second ports connected to transport conduit means and third ports connected to supply means, as well as a three-membered two-position valve plug moveable back and forth on said valve housing.

This patent document cited in the prior art has 3 conduits, being a straight discharge duct and 2 individual curved conduits that do not interconnect with each other, having 2 holes that connect with the reception of the fluid and the straight discharge conduit is also connected alternatively to two holes, so that outside the housing these two holes are joined by a 'Y'-shaped tubular connection for the discharge in a single conduction tube. This 'Y'-type connection is an obstacle to fluid flow, as well as restricting cleaning after operation.

U.S. Pat. No. 4,046,166 (Wibau. 1975) describes a valve specially adapted for use in conduits through which construction mixes, such as concrete mixes, flow. The valve cooperates with a pump with pistons in two respective pump cylinders. A valve housing forms a flat-walled valve piston chamber. The valve or piston plug also has flat walls to fit in the valve chamber with its flat walls.

This patent document mentioned in the prior art has two independent inlet conduits, has a "Y"-type bifurcation connection outside the housing that interconnects the two discharge holes, it is also noted that the discharge conduit, when connecting the connection in bifurcation forms an "S"-shaped curvature, which compromises the fluid flow and that, together with the "Y" bifurcation, makes access for cleaning difficult. It is also observed that all sides of the housing in contact with the valve are positioned at an angle to the face of the pump cylinders, these angles compromise (or generate complexity) for the sealing pressure/wear compensation devices of the sacrificial plates.

KR19960008044 (Choe, Kwang-Soo. 1994) describes an uncured concrete is poured into the supply hopper and, at the bottom of the supply hopper, to a pair of supply passages in fluid communication with, the supply passages communicating with each other with uncured concrete pumping supplied with a pair of engine pumping passages, the supply passages on both sides of the cylinders slide individually opening and closing the inlet valve as an inlet valve pair is provided.

This patent document cited in the prior art describes a valve for a concrete pump that has four sliding cylinders allowing the opening and closing for the passage of the product, but this embodiment has several drawbacks due to the constant need for lubrication and the great wear of the components due to friction, resulting in leaks and constant equipment downtime. In addition, this system does not reduce the waste generation.

CN102588268 (Han Guomin. 2012) describes a dispensing valve comprising an S-shaped tube, a drive mechanism with a shaft and an eyebolt plate, wherein the drive shaft is fixedly arranged on the wall of the S-shaped tube; the shaft drive mechanism is connected to the drive shaft. The S-shaped tube can continuously discharge and pump the concrete during the S-shaped tube replacement process.

This patent document cited in the prior art describes a valve for a concrete pump equipped with a rotary movement on an axis that allows the directing of the product in a continuous way, but this embodiment has several drawbacks due to the constant need for lubrication and the great wear of the components due to friction, resulting in leaks and constant equipment downtime. In addition, this system generates a lot of waste at the end of the operation and makes cleaning difficult for the operator.

CN202273848 (Sany. 2011) describes a feed port, two feed/discharge ports and two pump ports are arranged in the valve body; the valve core forms two suction passages and a pumping passage; the pumping passage has a predetermined size in the direction of extension of an inner slide. When the dispensing valve is in use, and in any state of the dispensing valve, at least one transport cylinder is communicated with the corresponding pumping port through the pumping passage and the dispensing valve allows the pumping system to pump continuously and non-stop.

This patent document cited in the prior art describes a valve similar to a sliding spool, and its embodiment and mode of operation are distant from the claimed device, as this device is a kind of tube (with due internal circuits) sliding in a longitudinally inside a cylindrical sleeve, so that we observed several inconveniences such as: impregnation of cement grout between the sliding contact parts, difficult cleaning of this impregnation in addition to great sensitivity to wear, it is also observed difficult compensation of wear to maintain the seal.

CN202301262 (Sany. 2011) describes a swing drive device, a distribution valve drive shaft and a first drive oil cylinder, wherein the drive mechanism is provided with a swing drive end, the distribution valve drive shaft is connected to the swing mechanism; and the first oil drive roller is provided with a piston rod which is connected with the swing driving end of the swing mechanism in a driving manner.

This document cited in the prior art describes an "S" bypass tube-type valve, commonly used by most pump manufacturers for this purpose, so that the valve switching device was changed instead of using a valve actuation lever of the "S"-tube that connects (in most manufacturers) to the cylinders through a spherical joint or an eyebolt-and-pin joint, this document describes a rack-and-pinion motion transfer, a device that features a higher manufacturing cost, being more susceptible to wear and more expensive to manufacture.

EP2700852 (Hunan. 2011) describes a distributing valve that includes a valve casing and a valve core located in the pumping chamber of the valve casing. The valve core is rotatably connected to the valve body, thus forming a main rotation axis (O). The valve casing has a discharge hole throughout casing wall, a first suction hole and a second suction hole.

This document cited in the prior art describes a rotary type switching valve, which describes a rotation of a certain angle of the device in an alternative way, unlike the vast majority the rotation axis of this valve has a vertical orientation, its embodiment and functional characteristics differ greatly from the claimed device. We observed as drawbacks rotating bearings submerged in concrete, wear plates sensitive to small wear, difficult wear compensation because they are species of half-moon shaped fins, male-female type, complex manufacturing and maintenance, in addition to presenting significant retention post-operation concrete and difficult access for cleaning enclosed parts.

EP2436927 (Sany. 2010) describes a distributing valve comprising a valve body and a wear resistance plate. The valve body comprises a first suction tube and a first pump tube, the rear end of the first suction tube is communicating with an outlet of a material container so as to communicate the material container and a transport cylinder. The rear end of the first pumping tube is rotatably connected to a concrete pump distribution line so as to communicate the transport cylinder and distribution line.

This document cited in the prior art describes a valve for a concrete pump equipped with a rotary movement that allows the opening and closing in a continuous way, but this embodiment has several drawbacks due to the constant need for lubrication and the great wear of the components due to friction, resulting in leaks and constant equipment downtime. In addition, this system generates a lot of waste at the end of the operation and makes cleaning difficult for the operator.

Therefore, the present inventor, seeking to solve the market and prior art drawbacks, has developed a valve for a concrete pump that minimizes the waste generation in order to facilitate cleaning on site, inhibiting the need for constant lubrication of the components due to commutation be performed by hydraulic fluid, and the fact of using hydraulic fluid, is not new, however, the absence of rotating bearings and/or even the existing ones, which have only linear translation does not have direct contact with the concrete or cement grout. It features a linear commutation that generates a much more homogeneous wear, minimizing leaks and maintaining a satisfactory performance throughout the life of the wear plates, and without the need for interventions to compensate for irregular wear.

Thus, the object of the present invention is a valve for a minimum-residue concreting pump that comprises an alternative double-piston type pump valve provided with an inlet conduit and an outlet conduit installed inside the valve container and arranged next to a concrete reception hopper located above the container, allowing to pump concrete and other pasty substances, such as: sludge, mining residues, grout, mortar, dirty water, among others. The embodiment of the valve generates the minimum of residue retained after the operation of the equipment, improving the durability and the use efficiency of the pumps, besides reducing the cleaning time which results in a great reduction of operational costs, avoiding the unnecessary displacement of the equipment for the central. In addition, this new embodiment results in a valve performing a linear translation movement that reduces component wear and minimizes the need for maintenance on the equipment, as its constructive form does not require constant lubrication.

SUMMARY OF THE INVENTION

It is feature of the present invention a valve for a minimum waste concrete pump providing a sealed valve container structure equipped with a cover screwed to the structure and which has a nozzle and vent points, on the back side it has a discharge tube and on the front side it has pumping tubes.

It is feature of the present invention a valve for a minimum waste concrete pump providing a structure that is provided in the inner portion by an inlet conduit interconnected to a discharge conduit, each conduit being provided with wear plates.

It is feature of the present invention a valve for a minimum waste concrete pump providing an inlet conduit equipped with a front plate that has three circular holes oriented in the same alignment, with the holes at the ends being channeled on one side of the plate by curved tubes in the form of a "joint", the other end of these curved tubes, join each other forming a new opening in oblong shape and the central circular hole of this plate has a projection that allows the telescopic connection of the discharge conduit.

It is feature of the present invention a valve for a minimum waste concrete pump providing a discharge conduit having a tapered body provided in its front portion by a circular-shaped opening and in the rear portion by an oblong-shaped opening.

It is feature of the present invention a valve for a minimum waste concrete pump providing a conduit that has cylindrical nozzles arranged on both sides, which are telescopically connected to the conduit nozzles through a spring that keeps the wear plates pressed against the structure walls.

It is feature of the present invention a valve for a minimum waste concrete pump providing a valve structure having in its front portion protrusions arranged in the upper and lower portions for the arrangement and housing of the switch cylinders.

It is feature of the present invention a valve for a minimum waste concrete pump providing switch cylinders that are fixed and positioned in the internal portion of the structure through fixing points for connection with the hydraulic flow.

It is feature of the present invention a valve for a minimum waste concrete pump providing double-acting hydraulic switch cylinders with double through-rod, equipped with rods connected at their ends with the projections of the front plate of the inlet conduit and jacket equipped with projections fixed at the structure points and connected to the hydraulic flow to promote the linear movement of the rods and conduits.

It is feature of the present invention a valve for a minimum waste concrete pump providing a discharge conduit having a slope in relation to the pump cylinders.

It is feature of the present invention a valve for a minimum waste concrete pump providing, in a second embodiment, a water recirculating system for the structure, by means of a water pump, which sends this water to an external circuit, and in this circuit passes through a filtration system to retain waste.

It is feature of the present invention a valve for a minimum waste concrete pump optionally providing the inlet orifice nozzle to connect to a pipe of rigid tubes or some flexible hose in order to have the hopper remote, or even to use the tubing to suction fluid from a hard-to-reach place.

DETAILED DESCRIPTION OF THE INVENTION

Figure 1:
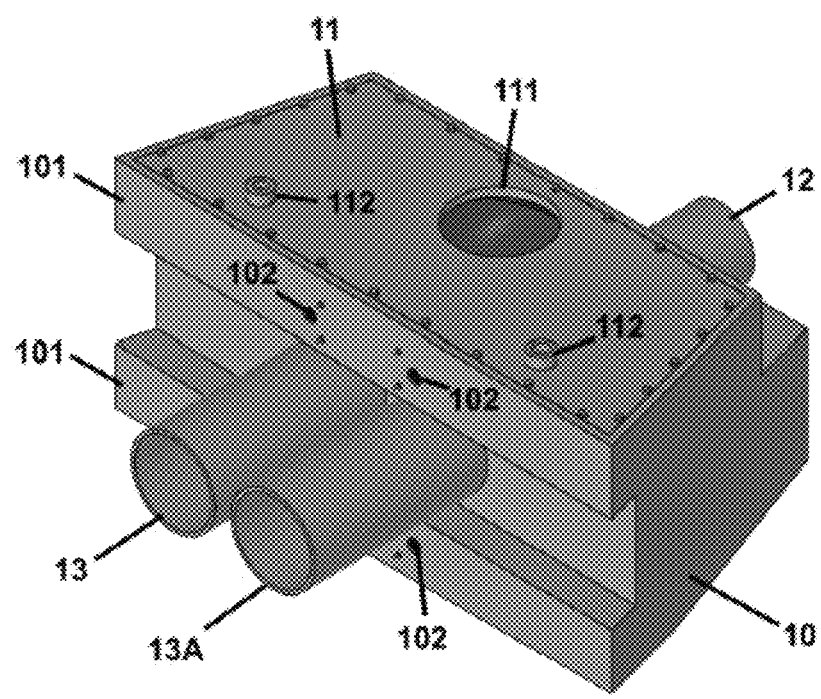
FIG. 1 shows the perspective view of the assembled concrete pump valve and FIG. 1A shows the rear view of the assembled concrete pump valve.
Figure 1A:
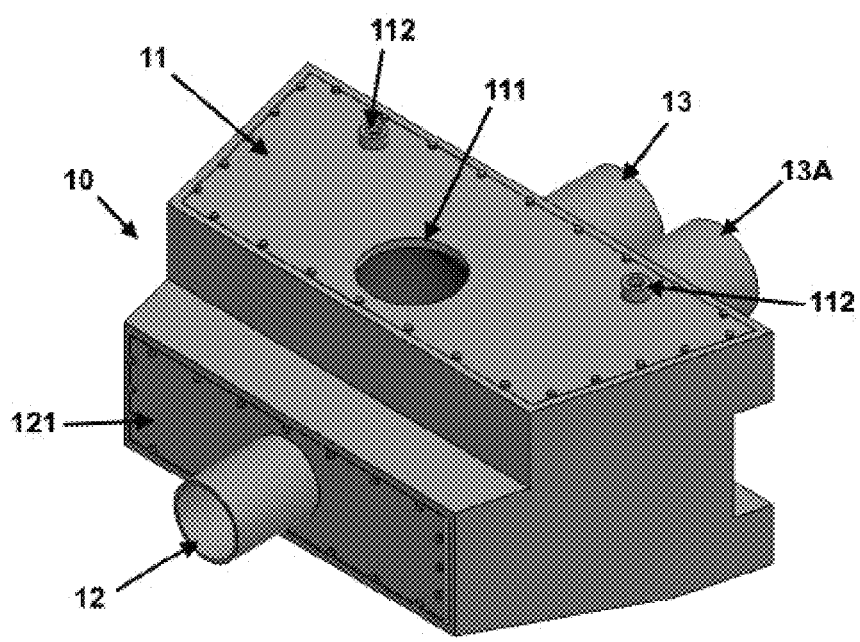
Figure 2:
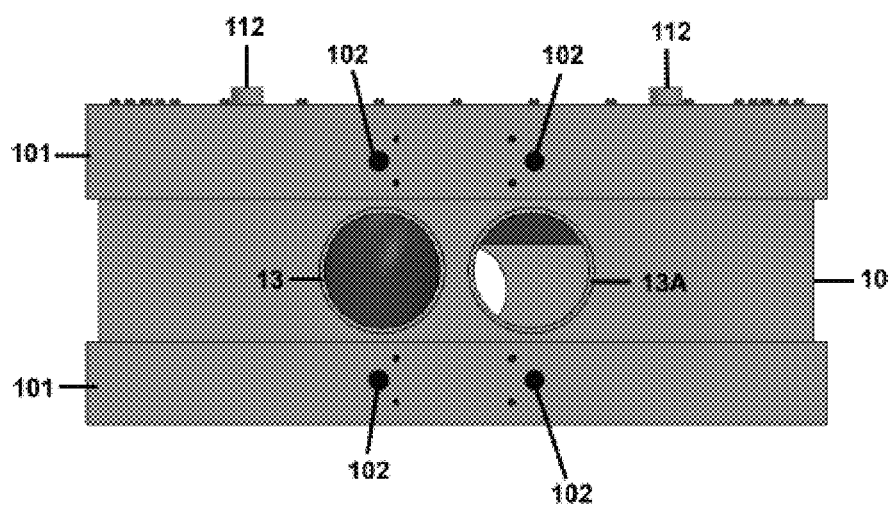
FIG. 2 shows the front view of the assembled concrete pump valve.
Figure 3:
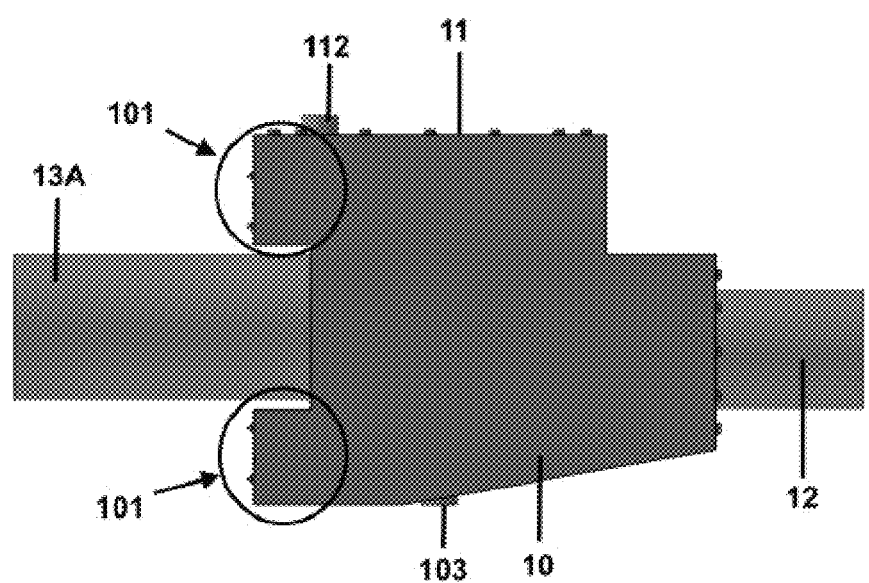
FIG. 3 shows the side view of the assembled concrete pump valve.
Figure 4:
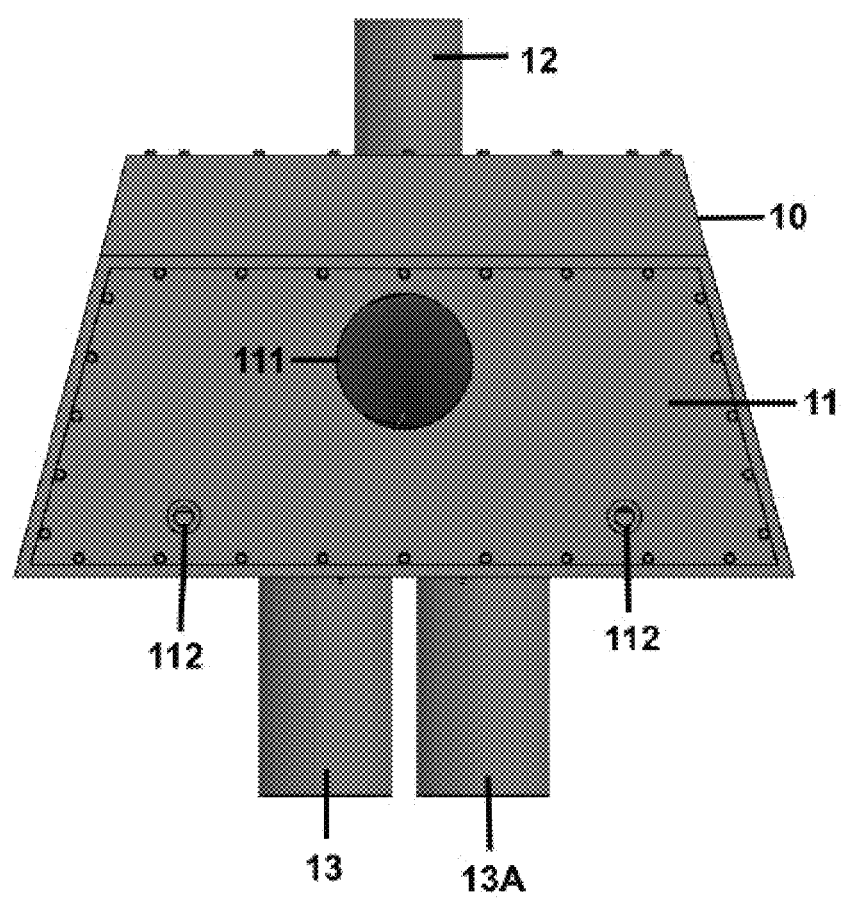
FIG. 4 shows the top view of the assembled concrete pump valve.
Figure 5:
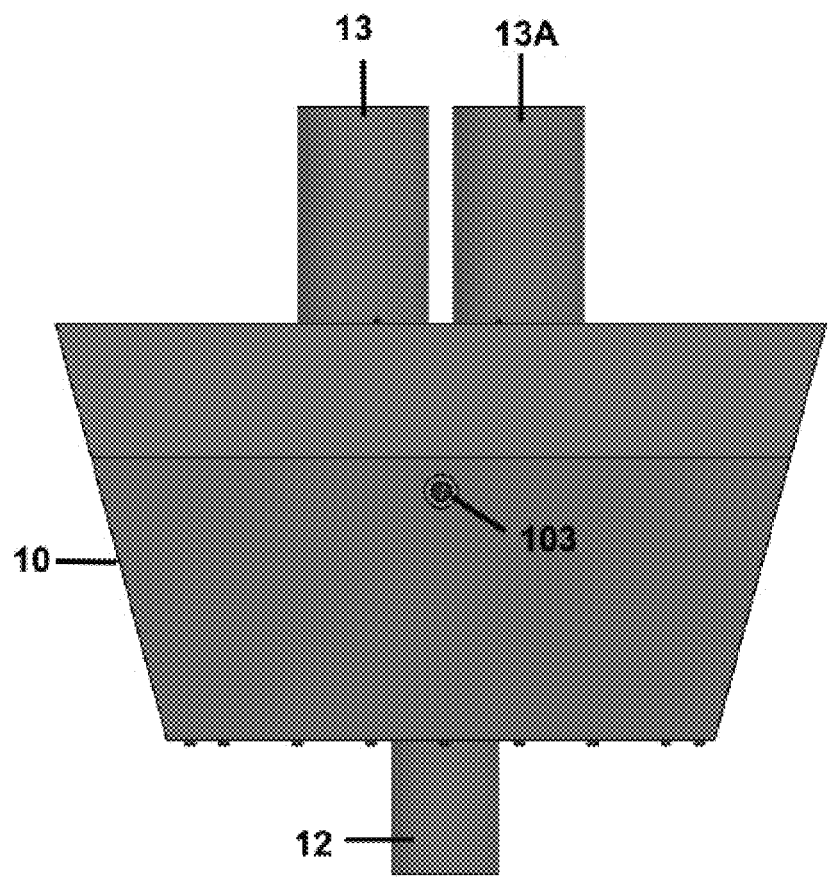
FIG. 5 shows the bottom view of the assembled concrete pump valve.
Figure 6:
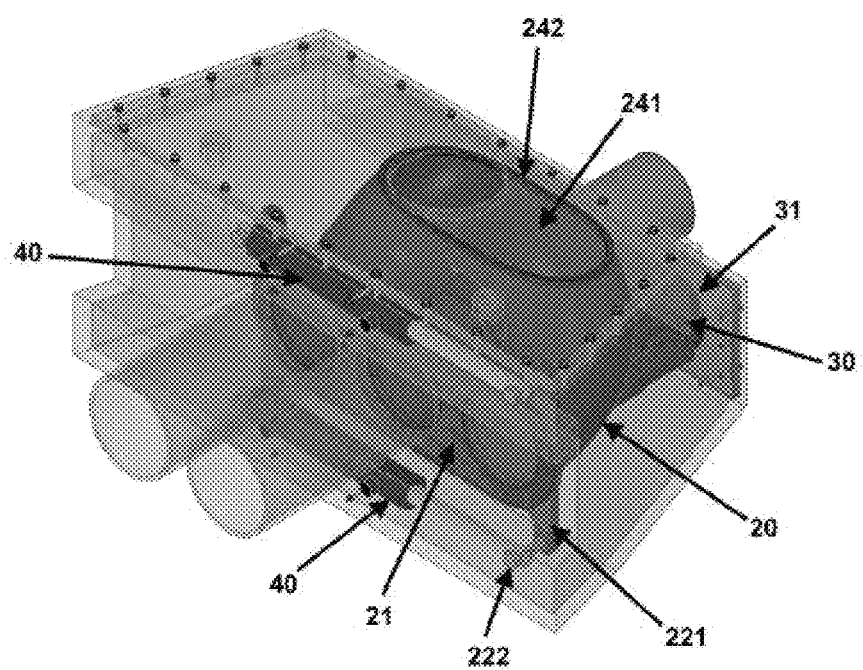
FIG. 6 shows the perspective view of the concrete pump valve detailing the internal components.
Figure 7:
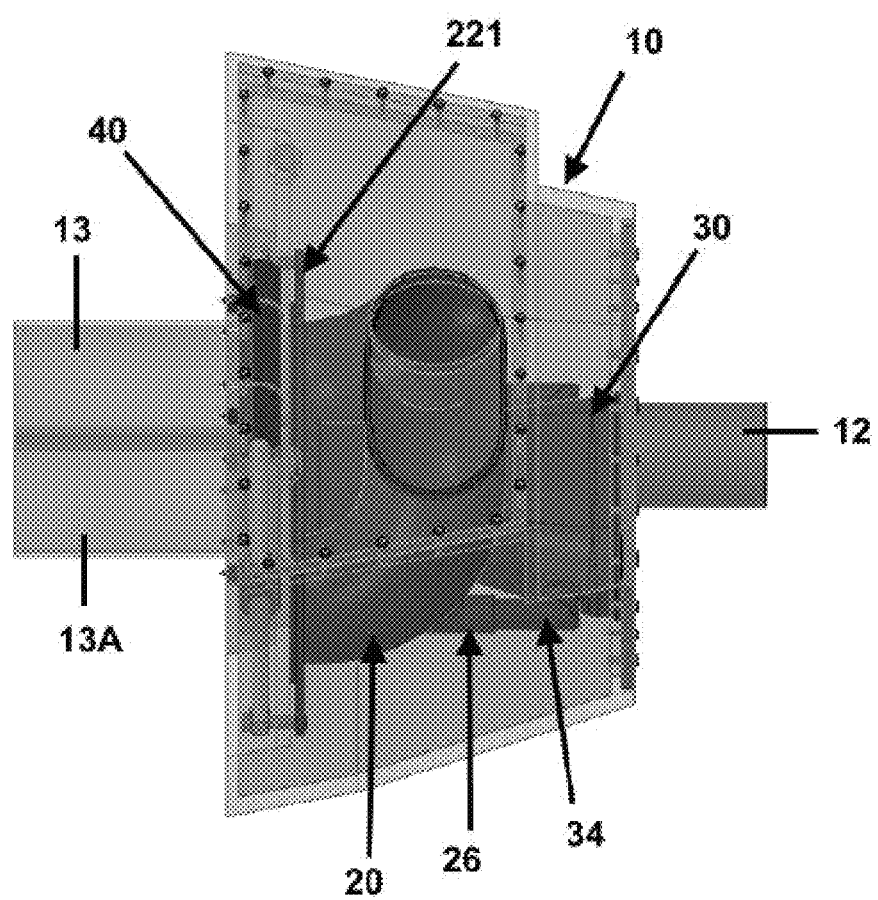
FIG. 7 shows the top perspective view of the concrete pump valve detailing the internal components.
Figure 8:
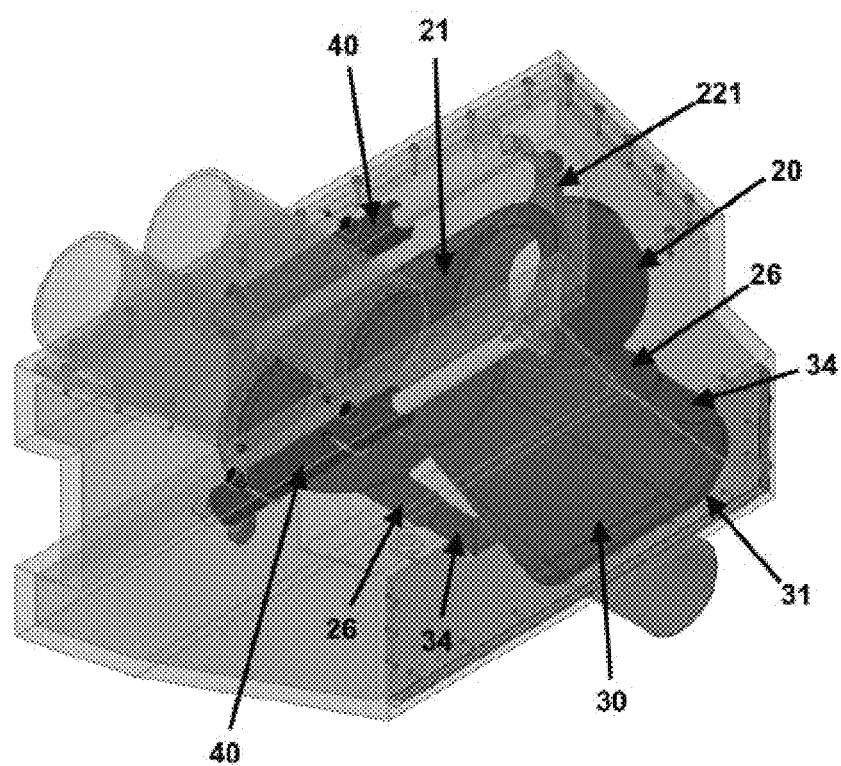
FIG. 8 shows the lower perspective view of the concrete pump valve detailing the internal components.
Figure 9:
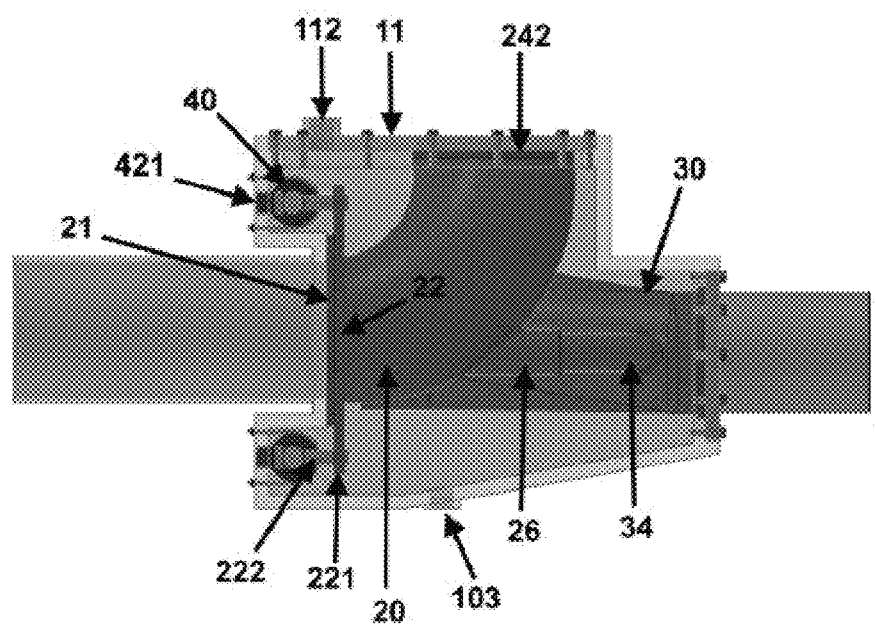
FIG. 9 shows the side view of the concrete pump valve detailing the internal components.
Figure 10:
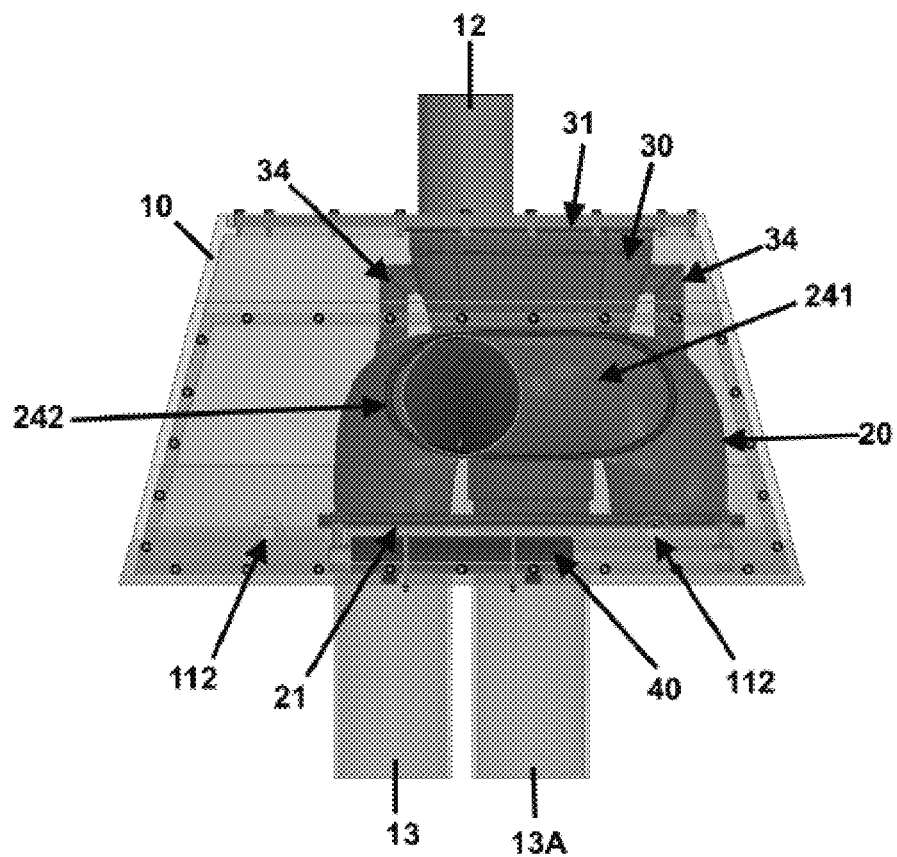
FIG. 10 shows the side view of the concrete pump valve detailing the internal components.
Figure 11:
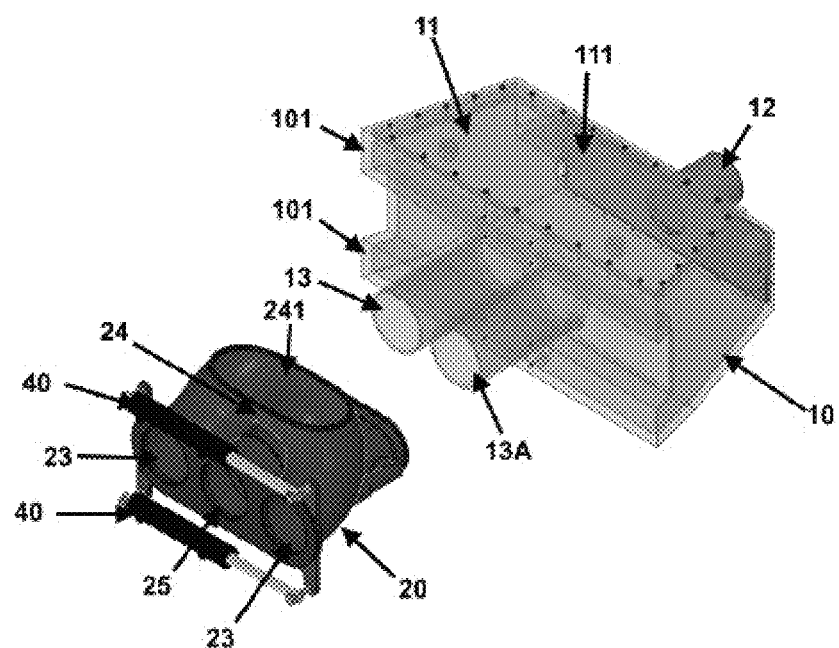
FIG. 11 shows the exploded view of the valve structure and internal components detailing its embodiment.
Figure 12:
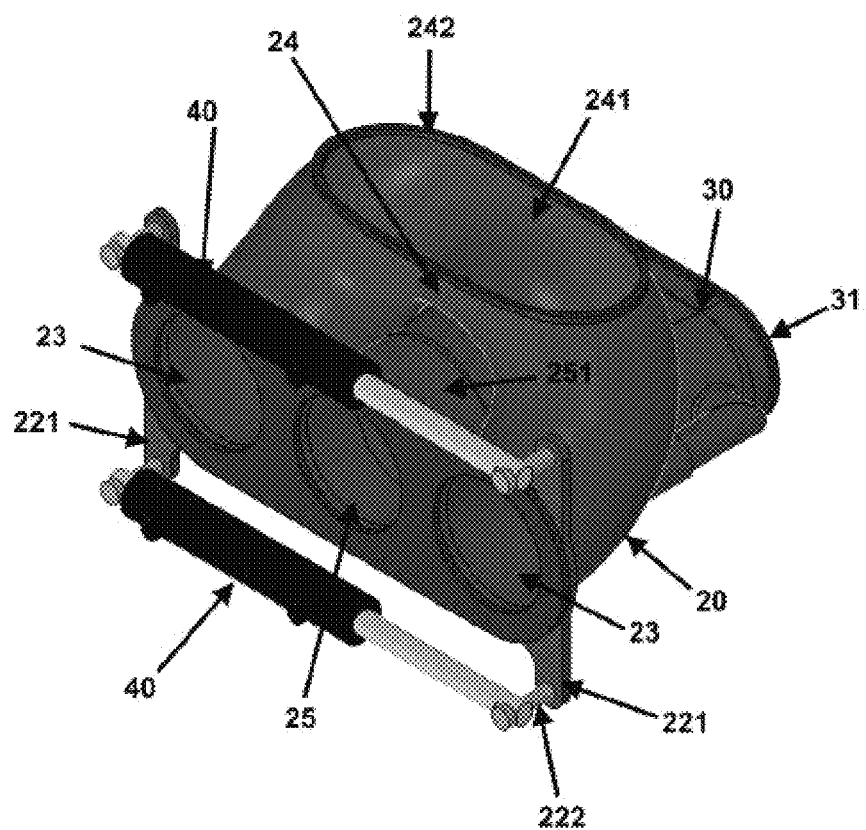
FIG. 12 shows the perspective view of the inlet conduit connected to the discharge conduit and switch cylinders detailing the embodiment.
Figure 13:
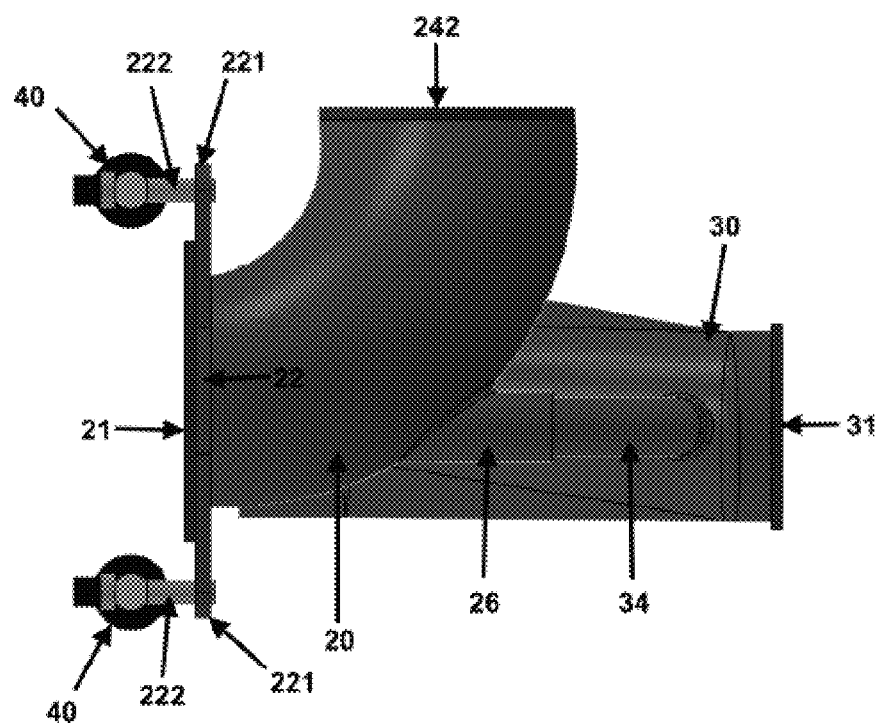
FIG. 13 shows the side view of the inlet conduit connected to the discharge conduit and switch cylinders detailing the embodiment.
Figure 14:
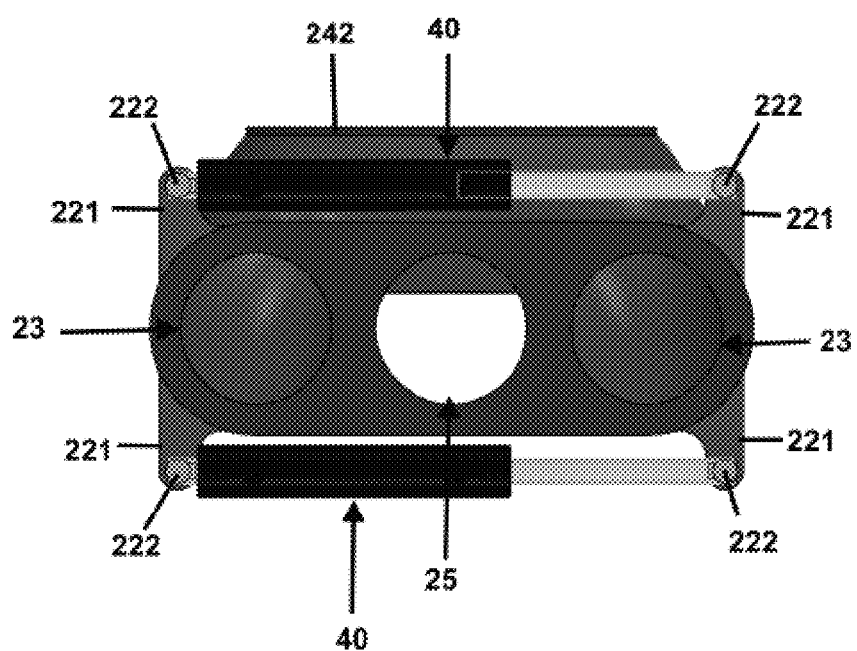
FIG. 14 shows the front view of the inlet conduit connected to the discharge conduit and switch cylinders detailing the embodiment.
Figure 15:
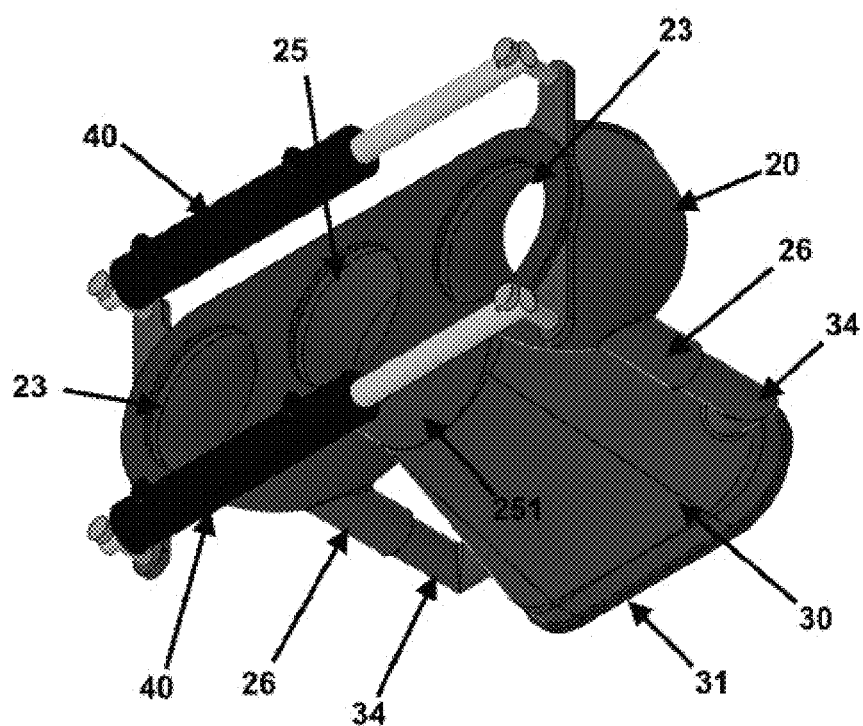
FIG. 15 shows the lower perspective view of the inlet conduit connected to the discharge conduit and switch cylinders detailing the embodiment.
Figure 16:
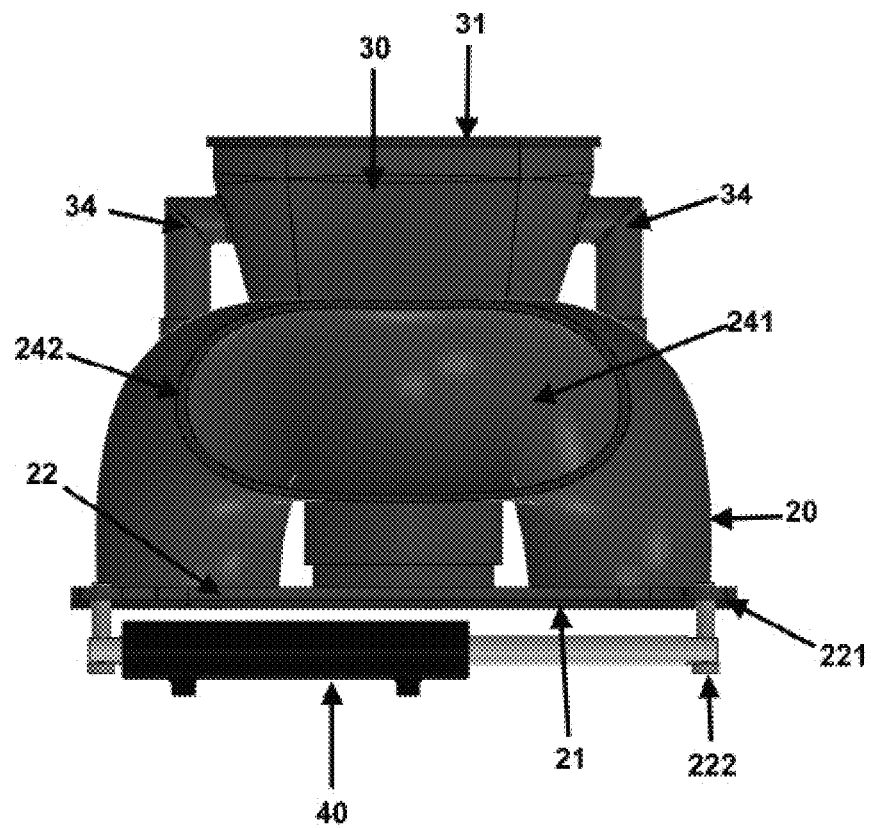
FIG. 16 shows the top view of the inlet conduit connected to the discharge conduit and switch cylinders detailing the embodiment.

The minimum waste concrete pump valve, object of the present invention, comprises a valve container structure (10) provided in the upper portion with a screwed cover (11) which purpose is to allow the opening, in this case for installation and removal of the inlet conduit, and for inspection, cleaning and replacement of wear parts, said cover (11) having an opening (111).

On the rear face of the structure (10) there is a discharge tube (12), and a screwed cover (121) which purpose is to allow opening, in this case for installation and removal of the discharge conduit, and for inspection, cleaning and replacement of wearing parts. In the front portion, the structure (10) has pump tubes (13) and (13A), and the cover (11) is screwed together with the container (10) in order to allow access to the interior when necessary.

The structure (10) allows the arrangement of the concrete reception hopper (not shown) along the opening (111) arranged in the upper portion so that the concrete is directed to the interior of the inlet conduit of the structure (10) by gravity.

The structure (10) is sealed so that it is designed to work when flooded with water, being provided with vent points (112) arranged on the cover (11) for pressure equalization and drainage point (103) along the lower portion of the container (10), said cover (11) allowing access to the internal components.

The structure (10) is provided in the inner portion by an inlet conduit (20) interconnected to a discharge conduit (30), so that each conduit is provided with wear plates (21) and (31).

The wear plate (21) is arranged between the inlet conduit (20) and the pump tubes (13) and (13A) of the structure (10) in order to avoid direct contact between the conduit (20) and the structure (10), and the wear plate (21) is the one that suffers from the friction of the set linear commutation.

The wear plate (31) is arranged between the discharge conduit (30) and the discharge tube (12) of the structure (10) in order to avoid direct contact between the conduit (30) and the structure (10), and the wear plate (31) is the one that suffers from the friction of the set linear commutation.

The inlet conduit (20) is provided with a front plate (22) equipped with projections (221) at its ends and equipped with two openings (23) at the ends connected to each other through a tube (24), said tube (24) having an opening (241) provided with a wear plate (242) that remains aligned along with opening (111) of the cover (11).

The front plate (22) of the conduit (20) also has an opening (25) provided with a projection (251) that allows the connection of the discharge conduit (30).

Figure 18:
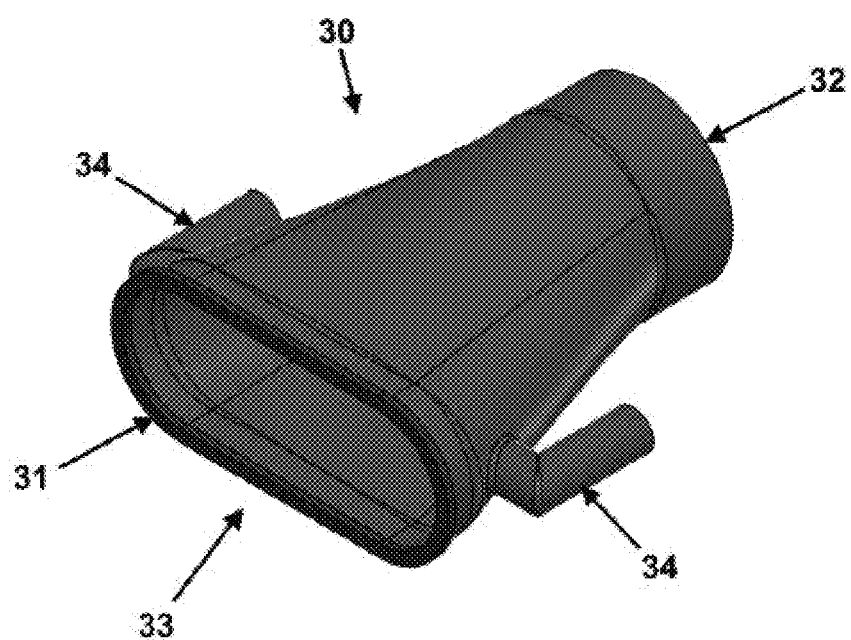
FIGS. 18 and 18A show perspective views of the discharge duct detailing its embodiment.
Figure 18A:
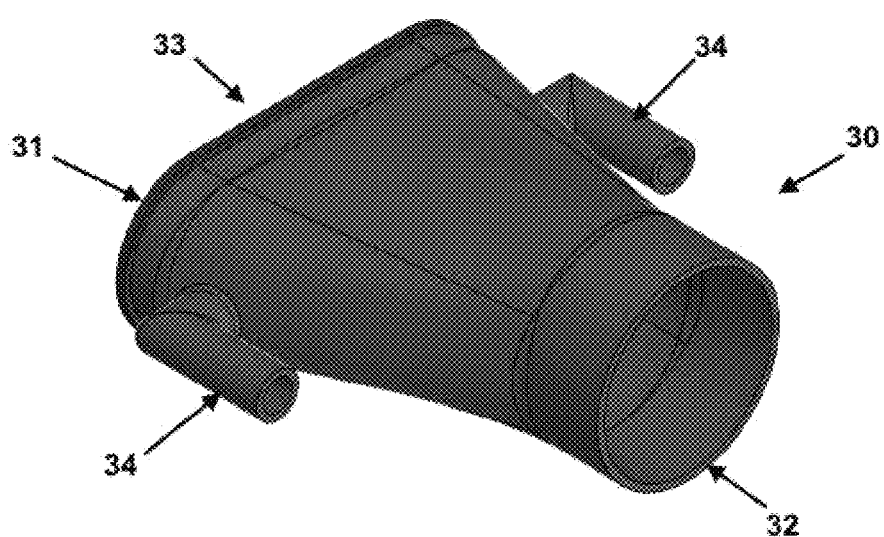

The discharge duct (30) has a tapered body provided in its front portion by an opening (32) of circular shape and in the rear portion by an opening (33) of oblong shape, said opening (32) that fits together with the projection (251) of the opening (25). The opening (33) provided by the wear plate (31) is aligned with the discharge tube (12) so that its oblong shape allows the conduit (30) to always be aligned with the tube (12) as the valve moves, according to FIGS. 18 and 18A.

The conduit (20) provided by the front plate (22) and openings (23) and (25) is aligned with the pump tubes (13) and (13A) so that the set movement is performed through a linear switching performed through of switch cylinders (40) connected together with the projections (221) of the plate (22) through pins (222), in order to allow the movement of the conduits (20) and (30) inside the valve structure (10).

The conduit (20) has cylindrical nozzles (26), arranged on both sides, which connect to the nozzles (34) of the conduit (30) telescopically through a spring (261) that holds the wear plates (21) and (31) constantly pressed against the walls of the structure (10), resulting in a permanent expansion system of great amplitude in order to keep the conduits (20) and (30) always adjusted despite the natural wear of the plates (21) and (31).

This pair (26) and (34) of cylindrical nozzles that are telescopically connected and house the springs (261), in addition to having the purpose of generating a contact pressure between the conduit (20) and (30) together with the respective walls of the structure (10) serve another purpose which is to transmit the switching movement from the inlet conduit (20) driven by the pair of switch cylinders (40) to the discharge conduit (30). They also serve to eliminate the possibility of rotational movement if the discharge conduit (30) were connected to the inlet conduit (20) only through the projection (251). Furthermore, they also serve to minimize the bending tendency existing between the two conduits (20) and (30) during valve switching.

Spiral (helical) springs (261) can be replaced with plate springs (not shown) in order to maintain the same functional characteristics.

The valve structure (10) has protrusions (101) in its front portion arranged in the upper and lower portions in order to allow the arrangement and accommodation of the switch cylinders (40).

The switch cylinders (40) are fixed and positioned in the internal portion of the structure (10) through fixing points (102) that allow the connection with the hydraulic flow for movement.

Figure 17:
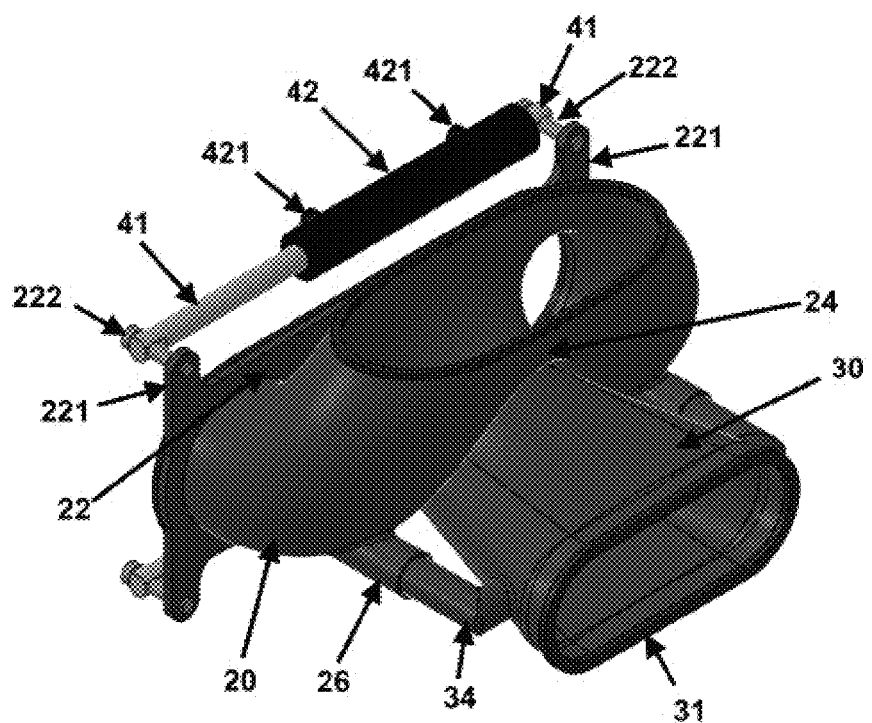
FIG. 17 shows the rear perspective view of the inlet conduit connected to the discharge conduit and switch cylinders detailing the components embodiment.

The double action switch cylinders (40) with double rod passing through are equipped with rods (41) connected at its ends with the projections (221) and sleeve (42) equipped with projections (421) fixed along with points (102) of the structure (10) and connected to the hydraulic flow to promote linear movement of the rods (41), as shown in FIG. 17.

The operation of the minimum waste concrete pump valve occurs through the unloading of the concrete into the hopper (not shown) arranged along with cover (11) opening (111) of the structure (10), wherein the concrete flows by gravity into the inlet conduit (20) through the opening (241) of the tube (24).

The valve being in this coupling state, a cycle of filling the pump cylinder (13) then begins, and the filling of this cylinder (13) takes place by the suction of the piston (not shown) inside the pump cylinder (13) and when the piston inside the cylinder reaches the end of its stroke, this state is detected by a sensor (not shown) that sends a signal to the equipment hydraulic central, which in turn simultaneously activates the switching of the pump valve. During the filling piston stroke of the pump cylinder (13), the emptying movement of the pump cylinder (13A) occurs simultaneously and at the same rate of filling of the latter.

Note that in the state prior to switching, the discharge flow from the pump cylinder (13A) is conducted into the discharge conduit (30), with one end of the discharge conduit (30) connecting in the two states of switching to the discharge tube (12), so that the discharge tube (12) will be coupled to the concrete conduction pipe. These two stroke states of the pump piston, like the two switching states of the valve, alternate continuously during the pumping process.

For the pump return operation, that is, for the inversion of the flow, wherein the equipment starts to suck from the concrete conduction pipe, through the discharge tube (12), and conduct the pumped fluid into the hopper, it is enough to invert the valve switching sequence by activating a certain command, which activates a hydraulic valve that inverts the activation sequence of the pump valve assembly.

In this mode, the transport cylinder that is discharging (emptying) will remain coupled to the inlet conduit (20) and the transport cylinder that is suctioning (filling) will remain coupled to the discharge conduit (30). These switching states alternate continuously during the return process.

After the end of a concrete pump operation, unlike most pumps used on the market, the minimum waste valve pump does not have a cover at the bottom of the hopper to evacuate the waste that is retained in the hopper, and which is dumped into the floor, so that you just pump until all the concrete is used up from inside the hopper, to somewhere inside the construction site, or even at the point where the concrete is poured.

As the concrete amount retained in the minimum waste valve is very small, a jet with pressurized water and a small amount of water is sufficient to complete the cleaning of the equipment.

Once the cleaning of the valve and pump cylinders has been completed, the valve container is drained, which is filled with water and is drained with a drain valve/register (not shown) that will be attached to the nozzle (103) arranged in the lower portion of the structure (10).

The valve container, where the conduits (20) and (30) are located, must always be filled with clean water at the beginning of each operation, and drained at the end. The valve container, flooded with water, is intended to keep it clean, removing wastes that propagate between the wear plate sets (21), (31) and (242). These wastes will only be the thin cement grout that will be diluted in the water in which the conduits are submerged, and it will be removed with the replacement of water after each concreting event.

In a second embodiment, it is foreseen for the removal of this cement grout that is diluted in the water of the container the possibility of using a water recirculating system of the container, by means of a water pump, which sends this water to an external circuit, and in this circuit, it passes through a filtering system to retain waste.

Another embodiment feature of this project, and very advantageous for the cleaning procedure, is the slope that the discharge conduit (30) presents in relation to the pump cylinders, favoring the flow of water with the waste by gravity.

Figure 19:
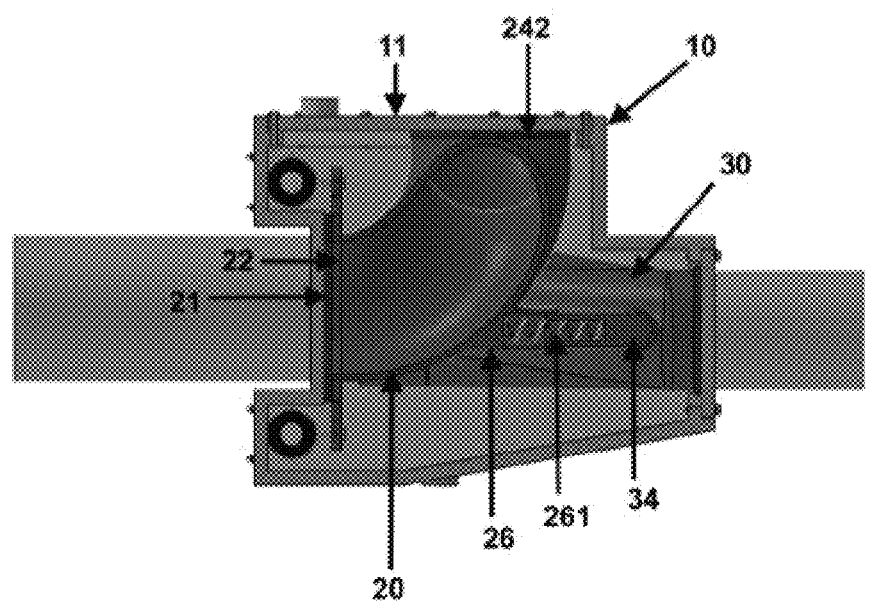
FIG. 19 shows the cross-section view of the inlet conduit connected to the discharge conduit and switch cylinders detailing the embodiment of the nozzles and spring.
Figure 20:
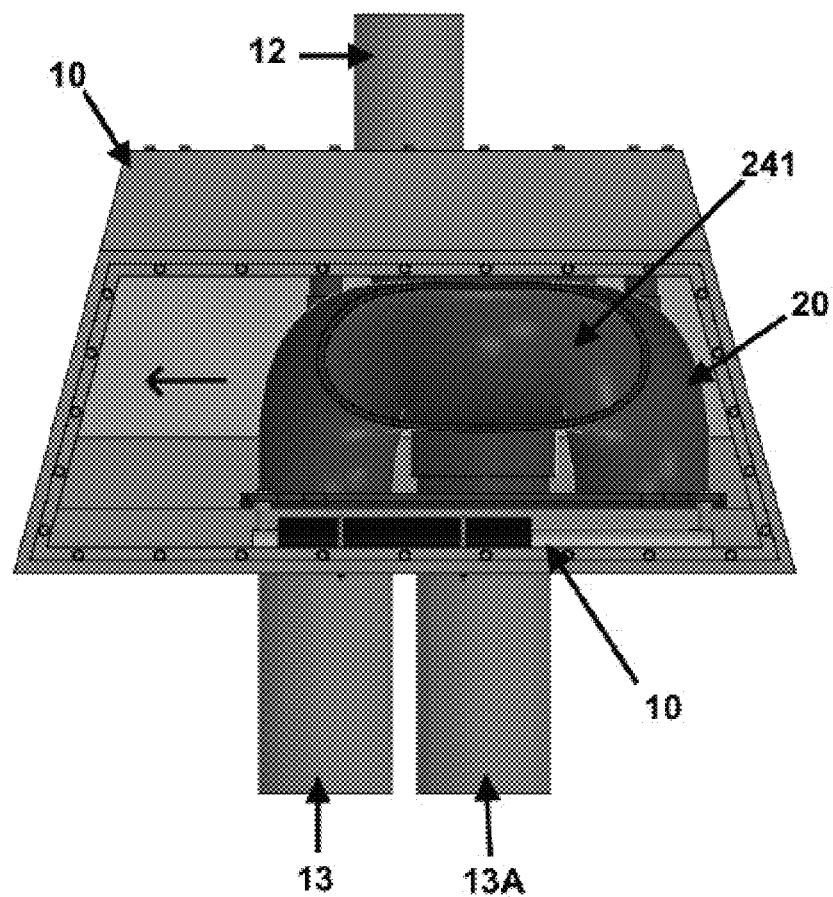
FIG. 20 shows the top view of the concrete pump valve in order to detail the internal components and the linear movement to the left.
Figure 21:
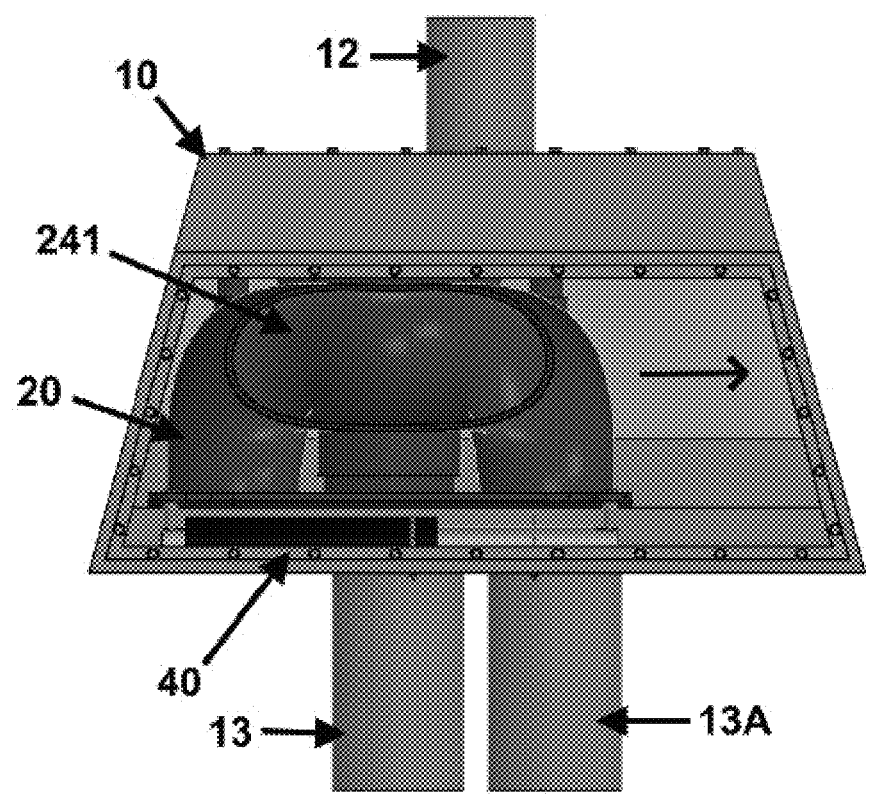
FIG. 21 shows the top view of the concrete pump valve in order to detail the internal components and the linear movement to the right side.

In this description of the valve operation, we consider its application for alternative double-cylinder pumps intended for pumping concrete and other pasty substances, and the valve then has two operating states (two switching positions), as shown in FIGS. 19 and 20.

Alternatively, the inlet hole nozzle (111) of the cover (11) can be connected to a pipe of rigid tubes or some flexible hose instead of the hopper, in order to have the hopper remote, or even to use the tubing to suction fluid from a hard-to-reach place.

The invention claimed is:

1. Minimum waste concrete pump valve comprising a hermetic valve container structure (10) flooded with water, equipped with a cover (11) screwed to the structure and having a nozzle (111) and vent points (112), on the rear face it has a discharge tube (12) and on the front side pump tubes (13) and (13A), said structure (10) which is provided in the inner portion with an inlet conduit (20) interconnected to a discharge conduit (30), each conduit being provided with wear plates (21) and (31); the inlet conduit (20) is provided with a front plate (22) with projections (221) at its ends and by two openings (23) at the ends connected to each other through a tube (24), said front plate (22) having an opening (25) provided with a projection (251) allowing the connection of the discharge conduit (30); the discharge conduit (30) has a tapered body provided in its front portion with an opening (32) of circular shape and in the rear portion with an opening (33) of oblong shape, said opening (32) fitting together with the projection (251) of the opening (25); the conduit (20) has cylindrical nozzles (26), arranged on both sides, which telescopically connect to the nozzles (34) of the conduit (30) through a spring (261) which holds the wear plates (21) and (31) pressed against the walls of the structure (10); the valve structure (10) has in its front portion protrusions (101) arranged in the upper and lower portions of arrangement and housing of the switch cylinders (40) which are fixed and positioned in the internal portion of the structure (10) through attachment points (102) for connection with the hydraulic flow, said double action with double through-rod switch cylinders (40), are provided with rods (41) connected at its ends with the projections (221) and sleeve (42) provided with projections (421) fixed along with points (102) of the structure (10) and connected to the hydraulic flow to promote the linear movement of the rods (41) and the conduits (20) and (30).

2. Minimum waste concrete pump valve, according to claim 1, characterized in that the vent points (112) arranged on the cover (11) equalize the internal pressures of the structure (10).

3. Minimum waste concrete pump valve, according to claim 1, characterized in that the wear plate (21) is arranged between the inlet conduit (20) and the pump tubes (13) and (13A) of the structure (10) in order to avoid direct contact between the conduit (20) and the structure (10), and the wear plate (21) is the one that suffers from the friction of the set linear commutation.

4. Minimum waste concrete pump valve, according to claim 1, characterized in that the wear plate (31) is arranged between the discharge duct (30) and the discharge tube (12) of the structure (10) in order to avoid direct contact between the conduit (30) and the structure (10), and the wear plate (31) is the one that suffers from the friction of the set linear commutation.

5. Minimum waste concrete pump valve, according to claim 1, characterized in that the tube (24) has an opening (241) provided with a wear plate (242) that remains aligned with the opening (111) of the cover (11).

6. Minimum waste concrete pump valve, according to claim 1, characterized in that the opening (33) is provided by the wear plate (31) which is aligned with the discharge tube (12) so that its oblong shape allows the conduit (30) to be aligned with the tube (12).

7. Minimum waste concrete pump valve, according to claim 1, characterized in that the conduit (20) provided with the front plate (22) and openings (23) and (25) is aligned with the pump tubes (13) and (13A) so that the movement of the set is performed through a linear commutation carried out through switch cylinders (40) connected together with the projections (221) of the plate (22) through pins (222), performing the movement of the conduits (20) and (30) within the valve structure (10).

8. Minimum waste concrete pump valve, according to claim 1, characterized in that the nozzles (26) and (34) generate pressure through the springs (261) generating a repulsive force between the two conduits in order to promote the compression of the wear plates.

9. Minimum waste concrete pump valve, according to claim 1, characterized in that the nozzles (26) and (34) transmit the switch movement from the inlet conduit (20) driven by the pair of switch cylinders (40) to the discharge conduit (30).

10. Minimum waste concrete pump valve, according to claim 1, characterized in that the nozzles (26) and (34) eliminate the possibility of rotational movement in case the discharge conduit (30) is connected to the inlet conduit (20) only through projection (251).

11. Minimum waste concrete pump valve, according to claim 1, characterized in that the nozzles (26) and (34) serve to minimize the bending tendency existing between the two conduits (20) and (30), during valve switching.

12. Minimum waste concrete pump valve, according to claim 1, characterized in that the spiral-type springs (261) are optionally replaced by plate-type springs (not shown).

13. Minimum waste concrete pump valve, according to claim 1, characterized in that the discharge conduit (30) has a slope in relation to the pump cylinders (13) and (13A).

14. Minimum waste concrete pump valve, according to claim 1, characterized in that in a second embodiment, a water recirculating system of the structure (10) is used by means of a water pump, which sends this water to an external circuit, and in this circuit, it passes through a filtering system to retain the waste.

15. Minimum waste concrete pump valve, according to claim 1, characterized in that, optionally, the inlet orifice nozzle (11) can be connected to a pipe of rigid tubes or some flexible hose, in order to have the remote hopper, or even to use the pipe to suction fluid from a place that is difficult to access.

* * * * *